United States Patent
Yoshihara et al.

(10) Patent No.: US 8,594,411 B2
(45) Date of Patent: Nov. 26, 2013

(54) PATHOLOGIC TISSUE IMAGE ANALYZING APPARATUS, PATHOLOGIC TISSUE IMAGE ANALYZING METHOD, AND PATHOLOGIC TISSUE IMAGE ANALYZING PROGRAM

(75) Inventors: Yoshiko Yoshihara, Tokyo (JP); Kenji Okajima, Tokyo (JP); Akira Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 160 days.

(21) Appl. No.: 13/376,073

(22) PCT Filed: Jun. 3, 2010

(86) PCT No.: PCT/JP2010/059433
§ 371 (c)(1),
(2), (4) Date: Dec. 2, 2011

(87) PCT Pub. No.: WO2010/140654
PCT Pub. Date: Dec. 9, 2010

(65) Prior Publication Data
US 2012/0082365 A1  Apr. 5, 2012

(30) Foreign Application Priority Data
Jun. 3, 2009 (JP) ................................. 2009-134218

(51) Int. Cl.
*G06K 9/00* (2006.01)

(52) U.S. Cl.
USPC ........................................................ 382/133

(58) Field of Classification Search
USPC ...................... 382/128, 129, 133; 377/10, 11;
250/461.2; 348/79, 80; 435/1.1, 40.5, 435/40.52
See application file for complete search history.

(56) References Cited

U.S. PATENT DOCUMENTS

| | | | | |
|---|---|---|---|---|
| 5,991,028 A * | 11/1999 | Cabib et al. | .................... | 356/456 |
| 8,199,998 B2 * | 6/2012 | Okajima et al. | .............. | 382/133 |
| 8,265,359 B2 * | 9/2012 | Andrushkiw et al. | ........ | 382/128 |
| 2004/0018546 A1 * | 1/2004 | Hung | ................................. | 435/6 |
| 2006/0127880 A1 * | 6/2006 | Harris et al. | ...................... | 435/4 |
| 2007/0177786 A1 * | 8/2007 | Bartels | .......................... | 382/133 |
| 2009/0116723 A1 | 5/2009 | Okajima et al. | | |
| 2009/0190821 A1 | 7/2009 | Marugame | | |
| 2009/0262993 A1 * | 10/2009 | Kotsianti et al. | .............. | 382/128 |

FOREIGN PATENT DOCUMENTS

| | | |
|---|---|---|
| JP | 02-035358 A | 2/1990 |
| JP | 2001-059842 A | 3/2001 |
| JP | 2004-286666 A | 10/2004 |
| JP | 2005-352571 A | 12/2005 |

(Continued)

OTHER PUBLICATIONS

International Search Report of PCT/JP2010/059433, dated Jul. 27, 2010.

*Primary Examiner* — Shervin Nakhjavan
(74) *Attorney, Agent, or Firm* — Sughrue Mion, PLLC

(57) ABSTRACT

This invention is directed to improvement of the accuracy of cancer differentiation in the pathologic diagnosis using a pathologic tissue image analysis. There are included a stroma area/duct area detecting module for detecting, from a biological tissue image, a duct area on the basis of duct characteristic information indicating the characteristic of ducts included in a tissue area in the biological tissue image; an intraduct cell-nucleus detecting module for extracting, based on a predetermined pigment reference, cell nucleuses included in the detected duct area; and a duct formation evaluating module for calculating a heterotypic degree of each duct on the basis of the distribution state of the cell nucleuses for a predetermined base areas in each duct.

11 Claims, 15 Drawing Sheets

(56) References Cited

FOREIGN PATENT DOCUMENTS

| | | | |
|---|---|---|---|
| JP | 2009-009290 A | 1/2009 |
| JP | 2009-115598 A | 5/2009 |
| JP | 2009-180539 A | 8/2009 |
| JP | 2009-210409 A | 9/2009 |
| WO | WO 2010/041423 A1 | 4/2010 |

* cited by examiner

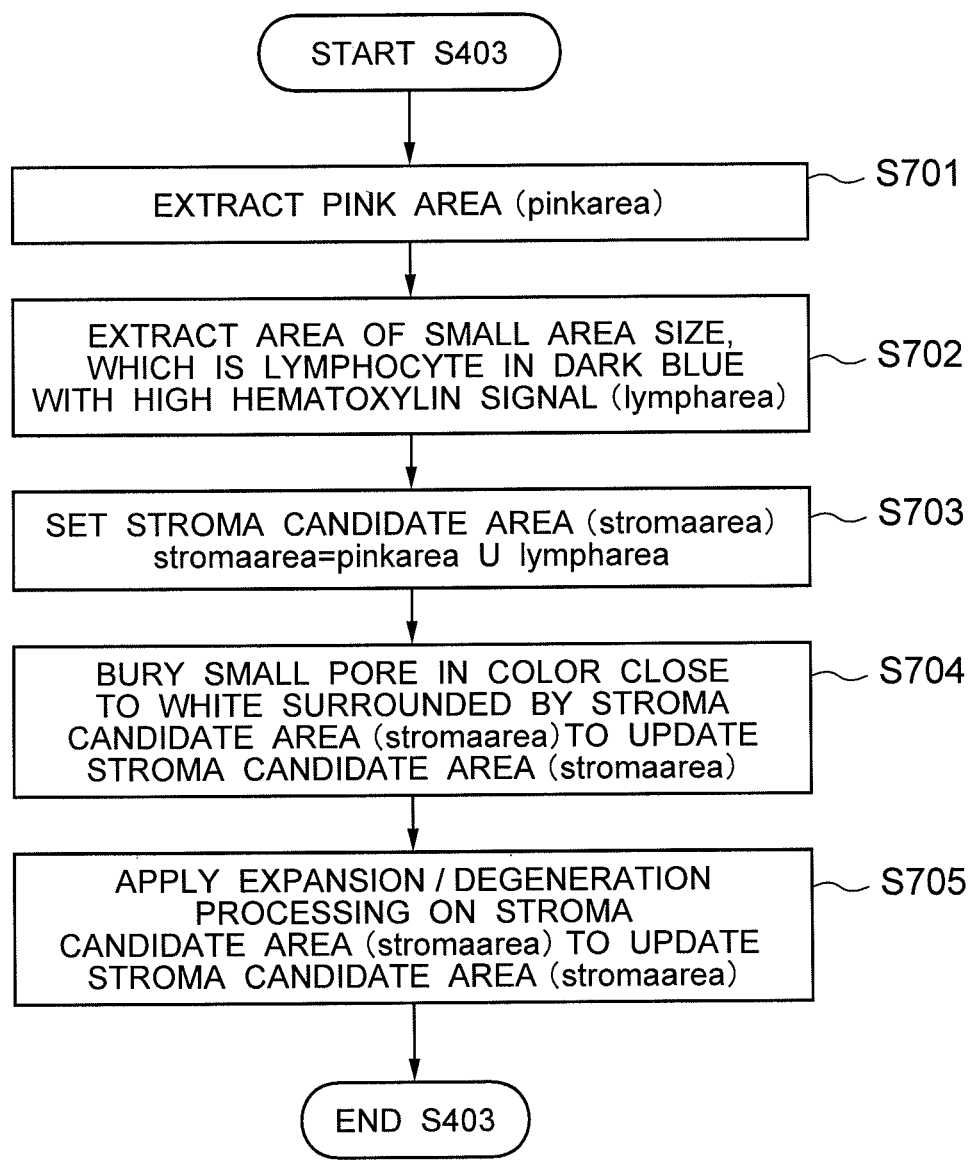

FIG.8A
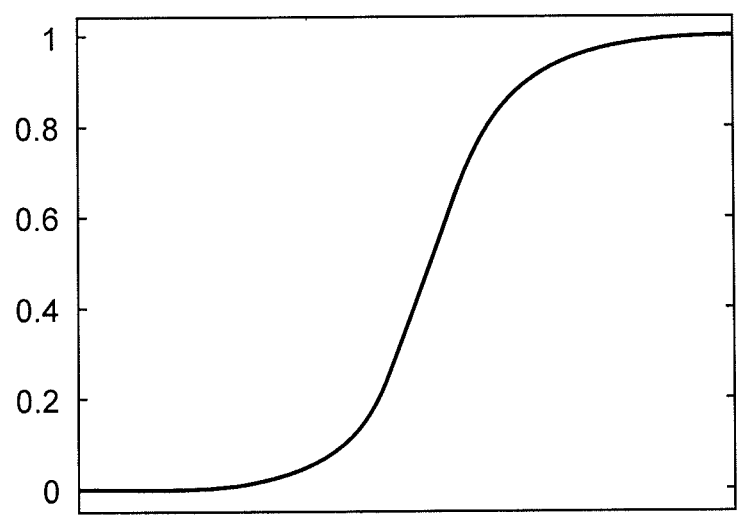
FIG.8B FIG.8C
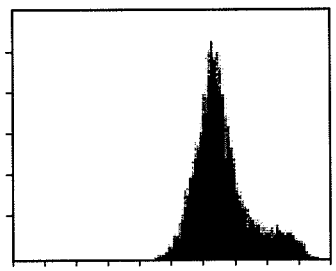 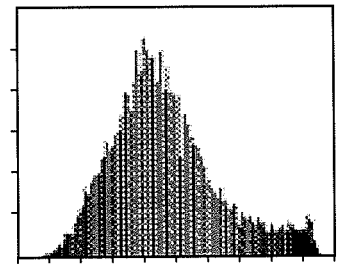

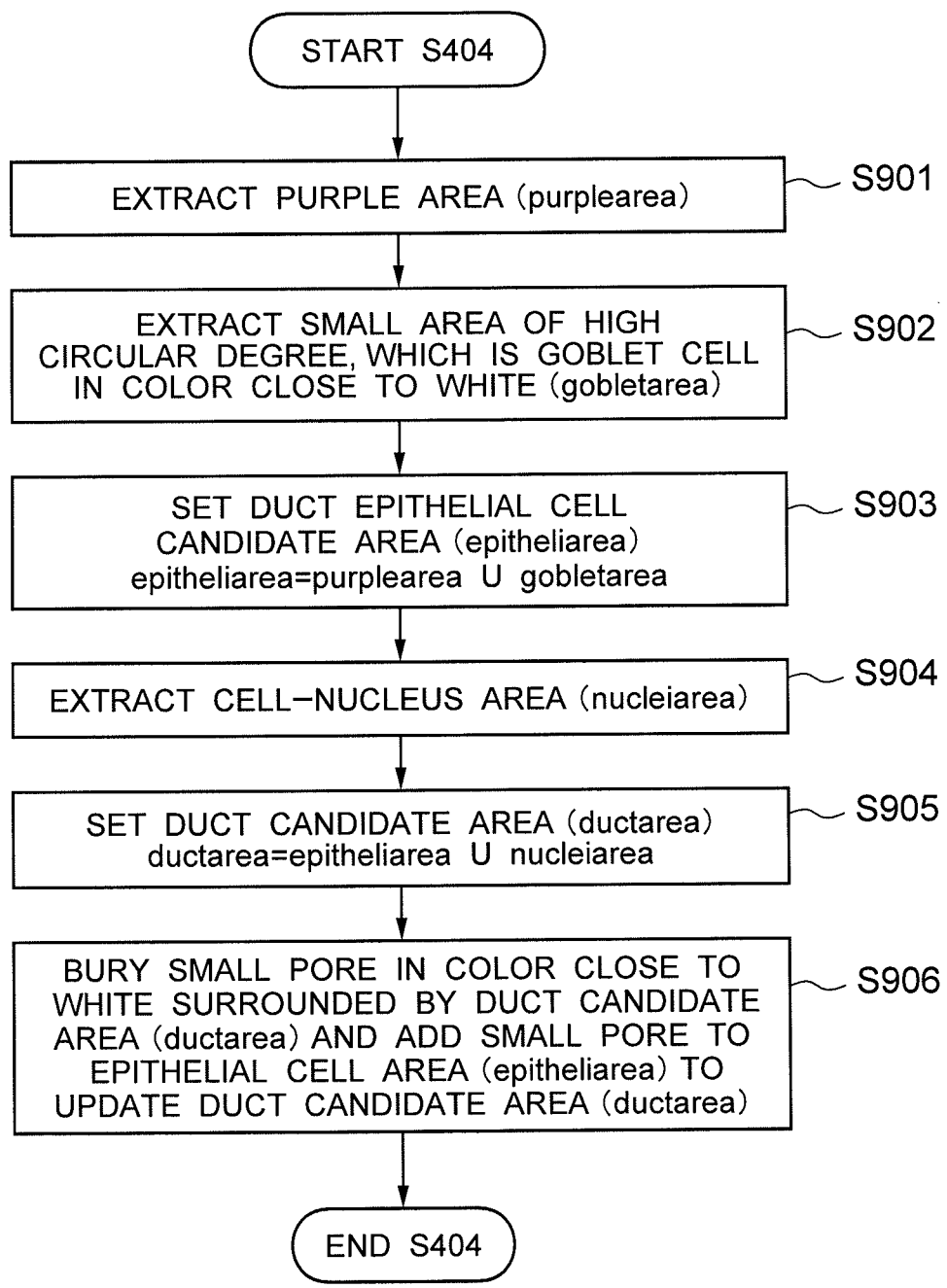

—1501

PATHOLOGIC TISSUE IMAGE ANALYZING APPARATUS, PATHOLOGIC TISSUE IMAGE ANALYZING METHOD, AND PATHOLOGIC TISSUE IMAGE ANALYZING PROGRAM

CROSS REFERENCE TO RELATED APPLICATIONS

This application is a National Stage of International Application No. PCT/JP2010/059433 filed Jun. 3, 2010, claiming priority based on Japanese Patent Application No. 2009-134218 filed Jun. 3, 2009, the contents of all of which are incorporated herein by reference in their entirety.

TECHNICAL FIELD

The present invention relates to a pathologic tissue image analyzing system which supports pathologic tissue image diagnoses performed by analyzing biological tissue images.

BACKGROUND ART

There have been disclosed related techniques regarding image analyzing apparatuses and systems for performing analyses effective for making diagnoses of pathologic tissue images through executing computer processing on digitized pathologic tissue images.

For example, there is considered a method which includes a module that detects ducts and a duct area constituted with a plurality of different ducts within a pathologic tissue image based on a closed area surrounded by a cell-nucleus area and a module that detects the ducts based on the number of the cell-nucleuses within a specific width of the periphery of the duct area, and performs an analysis of the pathologic tissue image by evaluating the uniformity of the sizes as well as the shapes of the nucleuses of the cell-nucleuses contained in the ducts detected by those modules and the abnormality in the polarities.

Among the pathologic tissue images, high differentiated adenocarcinoma observed particularly in a colonic biopsy includes many meandering ducts and most of shapes thereof are far from a substantially circular shape. Further, it is also characterized to have a large number of swollen vacant nucleuses.

Further, pseudo-stratification of the cell-nucleuses in the duct area is conspicuous. Thus, the stratification parts of the cell-nucleuses are not arranged on the base side and distributed irregularly, and this tendency is prominent.

Therefore, it is not possible with the above-described method to extract the area as a closed area surrounded by the cell-nucleus area when the cell-nucleuses are not arranged in an orderly manner or when there are vacant cell-nucleuses. Further, also when detecting a duct based on a gland lumen area, it is not possible to extract the area when the gland lumen area is not closed.

Further, when a plurality of cell-nucleuses forming the duct are connected, it is difficult to discriminate each one of the cell-nucleuses separately even if a high-magnification image is used. Furthermore, the vacant cell-nucleus is shown in white on the image, so that the vacant cell-nucleus cannot be recognized as a nucleus. Therefore, it is not possible to precisely evaluate the uniformity of the sizes as well as the shapes of the cell-nucleuses contained in the ducts and the abnormality in the polarities.

As a related technique thereof, there is disclosed a system which acquires distribution information of cell-nucleuses and cytoplasm contained in a pathologic image based on a NC ratio (area of nucleuses within a cell area of cytoplasm within a cell) which shows the proportion of the area of the cytoplasm occupying the cell with respect to the area of the cell-nucleuses within the cell in a tissue image in a quantitative manner, and determines the distribution of a cancer part and the progression degree of the cancer based on the information (Patent Document 1). This method is particularly considered effective in the prostate cancer diagnoses.

Further, as a related technique thereof, there is disclosed a method which selects a gland lumen based on luminance information, sets a contour of the gland lumen within an image, acquires a frequency distribution of a dark purple color on an equidistant curve from the gland lumen, discriminates the ducts by distinguishing the ducts from blood vessels by observing the peak positions, and analyzes the concentric structure (particularly the structure of the prostate) contained in the pathologic image (Patent Document 2).

Furthermore, as a related technique thereof, there is disclosed a method which extracts construction information of cell-nucleuses by using image processing and searches past similar case images by using it as a characteristic amount (similar image searching) to make it possible to support doctors' diagnoses (Patent Document 3). This method is particularly considered effective in the stomach biopsy diagnoses.

In order to extract the construction information of the cell-nucleuses, this related technique first acquires a threshold value by using a discrimination/analysis method according to luminance components for separating the cell-nucleus areas, and detects cell-nucleus construction area by slightly shifting the threshold value.

Then, this related technique provides a similarity searching method which uses the area content rate showing the rate of the cell-nucleus construction areas occupying the area of the cytoplasm and the average area of the cell-nucleus construction areas as cell-nucleus construction characteristic amounts. The cell-nucleus construction area shows the duct area.

Patent Document 1: Japanese Unexamined Patent Publication 2004-286666
Patent Document 2: Japanese Unexamined Patent Publication 2005-352571
Patent Document 3: Japanese Unexamined Patent Publication 2009-9290

However, the related technique disclosed in Patent Document 1 is a diagnosis using the NC ratio, and it simply compares the area of the cell-nucleuses and the area of the cytoplasm contained in a specific area within an image in a comprehensive manner but does not evaluate the arrangement of each of the cell-nucleuses.

Thus, the characteristics of cancer cells that can be measured based on the NC ratio are limited only to swelling of the nucleuses and the like. Therefore, the information of the NC ratio is insufficient for evaluating the ducts so that evaluations cannot be done accurately.

Further, while the related technique disclosed in Patent Document 2 can be adapted to discriminating the ducts from the blood vessels, evaluations are done by exceeding the boundary of the duct area on an equidistant curve because of the thickness of the ducts when evaluating formation of the ducts.

Furthermore, this is a method which is employed on assumption that the gland lumen is a closed area and the equidistant line is a closed curve. Therefore, it cannot be employed to a case that includes a protruded structure such as an actual duct and a looped and filled structure and to a case where the gland lumen is not a closed area.

Moreover, with the technique disclosed in Patent Document 3, a lymphocyte of high luminance colored in dark blue is mis-detected as a duct area in the discriminating analysis of luminance components.

Further, with the technique disclosed in Patent Document 3, goblet cells existing within the duct area colored in a light color by Hematoxylin-Eosin stain (HE) are handled as a background area. Thus, detection of the duct areas becomes inaccurate.

Furthermore, the amount for characterizing the duct is a ratio, and it is insufficient to evaluate the duct by a primary statistic only with the ratio.

An object of the present invention is to provide a pathologic tissue image analyzing apparatus, a pathologic tissue image analyzing program, and a pathologic tissue image analyzing program, which can effectively improve the differentiation accuracy of cancers in pathologic diagnoses done by performing pathologic tissue image analyses.

DISCLOSURE OF THE INVENTION

In order to achieve the foregoing object, the pathologic tissue image analyzing apparatus according to the present invention is a pathologic tissue image analyzing apparatus which includes an image analyzing main unit which conducts an analysis of a biology tissue image inputted from outside, extracts ducts contained within a tissue area of the biology tissue image based on a result of the analysis, and extracts a duct of a specific heterotypic degree from a duct area containing the ducts, wherein the image analyzing main unit is characterized to include: a duct area detecting module which detects the duct area from the tissue area based on preset duct characteristic information that shows characteristics of the ducts within the tissue area; a cell-nucleus extracting module which extracts cell-nucleuses contained in the detected duct area based on a preset pigment reference; and a duct heterotypic degree calculating module which calculates the heterotypic degree of the duct based on a distribution state of the extracted cell-nucleuses with respect to a preset base area in the duct.

Further, the pathologic tissue image analyzing method according to the present invention is a pathologic tissue image analyzing method, which conducts an analysis of a biology tissue image inputted from outside and extracts a duct of a specific heterotypic degree from ducts contained within a tissue area of the biology tissue image based on a result of the analysis, and the method is characterized to include: detecting the duct area from the tissue area based on preset duct characteristic information that shows characteristics of the ducts within the tissue area; extracting cell-nucleuses contained in the detected duct area based on a preset pigment reference; and calculating the heterotypic degree of the duct based on a distribution state of the extracted cell-nucleuses with respect to a preset base area in the duct.

Furthermore, the pathologic tissue image analyzing program according to the present invention is a pathologic tissue image analyzing program for conducting an analysis of a biology tissue image inputted from outside and extracting a duct of a specific heterotypic degree from ducts contained within a tissue area of the biology tissue image based on a result of the analysis, and the program is characterized to cause a preset computer to execute: a duct area detecting function which detects the duct area from the tissue area based on preset duct characteristic information that shows characteristics of the ducts within the tissue area; a cell-nucleus extracting function which extracts cell-nucleuses contained in the detected duct area based on a preset pigment reference; and a duct heterotypic degree calculating function which calculates the heterotypic degree of the duct based on a distribution state of the extracted cell-nucleuses with respect to a preset base area in the duct.

The present invention employs the structure which includes the module that detects the duct area by extracting/eliminating the stroma in a pathologic tissue image and the module that evaluates the arrangement distribution of the cell-nucleuses that form the ducts by a duct unit, so that the heterotypic degree of each duct can be calculated precisely. This makes it possible to differentiate a cancer with a high accuracy when conducting a pathologic diagnosis by performing the pathologic tissue image analysis and to support diagnoses done by doctors effectively.

BRIEF DESCRIPTION OF THE DRAWINGS

FIG. 7 is a flowchart showing entire action processing steps for extracting a stroma candidate area from an input image of the pathologic tissue image analyzing apparatus disclosed in FIG. 1;

FIG. 8A is an explanatory chart showing an example of a sigmoid curve that is utilized in value enhancing processing performed by the pathologic tissue image analyzing apparatus disclosed in FIG. 1, FIG. 8B is an explanatory chart showing an example of a histogram of the value of blue utilized in the value enhancing processing, and FIG. 8C is an explanatory chart showing an example of a histogram in which the value in FIG. 8B is enhanced;

FIG. 9 is a flowchart showing action processing steps for extracting a duct candidate area from an input image of the pathologic tissue image analyzing apparatus disclosed in FIG. 1;

BEST MODES FOR CARRYING OUT THE INVENTION

Next, basic structural contents of exemplary embodiments of the invention will be described.

Figure 1:
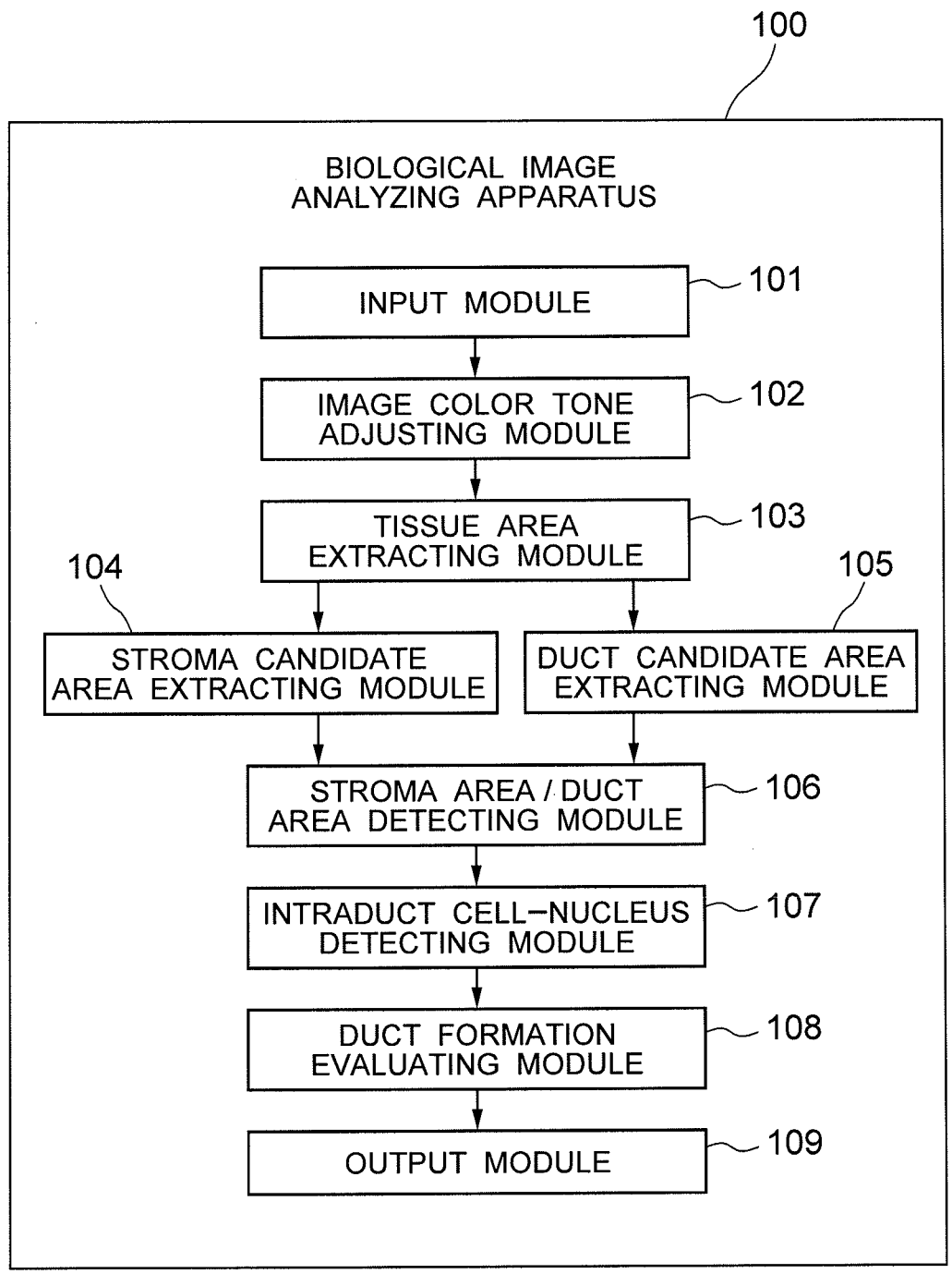
FIG. 1 is a schematic block diagram showing an exemplary embodiment of a pathologic tissue image analyzing apparatus according to the present invention.

As shown in FIG. 1, a biological image analyzing apparatus (an image analyzing main unit) 100 includes: an input module 101 which acquires a biological image (pathologic tissue image) inputted from outside; an image color tone adjusting module 102 which adjusts colors of a tissue area (tissue image area) in the biological image sent via the input module 101 based on pigment information set in advance; and a tissue area extracting module 103 which extracts the tissue area by eliminating a background area from the biological image whose color is adjusted by the image color tone adjusting module 102.

Further, the biological image analyzing apparatus (referred to as an "image analyzing apparatus" hereinafter) 100 includes: a stroma candidate area extracting module 104 which extracts a stroma area candidate based on a texture characteristic of stroma contained in the tissue area extracted by the tissue area extracting module 103; a duct candidate area extracting module 105 which extracts a candidate of a duct area (constituted with a plurality of different ducts) based on characteristic information that shows characteristics of the ducts set in advance; and a stroma area/duct area detecting module 106 which collates the stroma candidate area and the duct candidate area extracted as the candidate areas by the stroma candidate area extracting module 104 and the duct candidate area extracting module 105, and determines the stroma area and the duct area by setting each area so that the stroma area and the duct area become exclusive areas.

Further, the image analyzing apparatus 100 is structured to include: an intraduct cell-nucleus detecting module 107 which detects cell-nucleuses by extracting signals of Hematoxylin set in advance from the determined duct area; a duct formation evaluating module 108 which evaluates (calculates) the heterotypic degree of each duct by the distribution of the nucleuses in the ducts; and an output module 109 which outputs the evaluation result of the heterotypic degree by the duct formation evaluating module 108 on a display set in advance.

The image analyzing apparatus 100 is a computer system, and a CPU (processor) performs execution processing of a program set in advance to achieve the actions of each of the modules (FIG. 1) provided to the image analyzing apparatus (image analyzing main unit) 100. The program for constructing each of the modules of the image analyzing device on software is recorded on a recording medium and treated as a target of commercial transactions.

The input module 101 has a memory area which temporarily stores a biological image (image data) that is inputted from the outside of the image analyzing apparatus 100 and digitized. The image data of the exemplary embodiment is HE dye-processed, in which nucleuses of each cell (cell-nucleuses) are dyed in bluish purple and cytoplasm components as well as stroma components are dyed in pink.

Figure 2:
FIG. 2 is an explanatory image showing an example of a large intestine biopsy that is an input image of the pathologic tissue image analyzing apparatus disclosed in FIG. 1.
Figure 3:
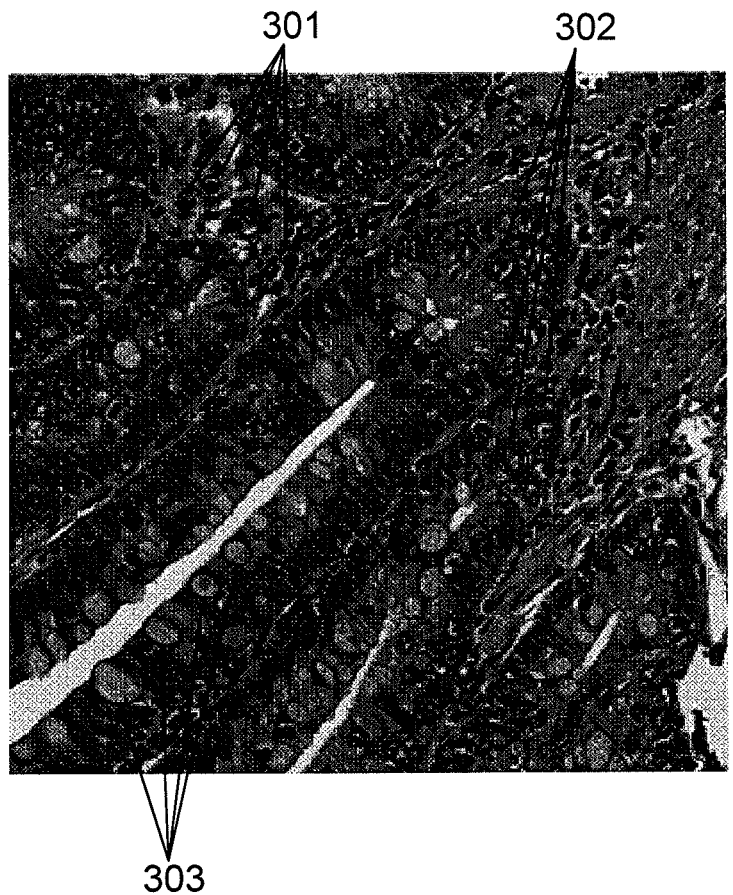
FIG. 3 is an explanatory image that is a fragmentary enlarged image of an input image of the pathologic tissue image analyzing apparatus disclosed in FIG. 1.

FIG. 2 shows an example of the image data inputted to the input module 101. This image data shows an example of a large intestine biopsy image dyed by HE dyeing. FIG. 3 shows an enlarged image of a part of the area of FIG. 2.

The image color tone adjusting module 102 has a color tone adjusting function which adjusts color signals in white and hematoxylin in the biological image (image data) inputted from the input module 101 based on preset white and hematoxylin.

Further, the image color tone adjusting module 102 sends the image data that has undergone the color tone adjustment to the tissue area extracting module 103.

The tissue area extracting module 103 performs processing for eliminating a background area that is close to white on the image data sent from the image color tone adjusting module 102 based on the saturation and the value in the image data (a background area elimination processing function).

Further, the tissue area extracting module 103 extracts a tissue area as a large chunk of tissues by performing image processing which buries white pores that are smaller than a preset threshold area.

Thereby, the tissue area extracting module 103 can set the tissue area containing a part that is in white in vacant nucleuses (e.g., area 302 in FIG. 3), a goblet cell close to white (e.g., area 303 in FIG. 3), and a part that is in white in the stroma.

The stroma candidate extracting module 104 extracts an image area exhibiting a texture characteristic in which pink that is the characteristic of the stroma, a flat and small-piece lymphocyte dyed in dark blue (e.g., area 301 in FIG. 3), and the stroma whose color is faded into white are contained in a mosaic pattern from the image data sent via the tissue area extracting module 103 as a stroma candidate area within the tissue area.

The duct candidate area extracting module 105 extracts an area that is of a high hematoxylin signal and estimated as a cell-nucleus, an area dyed in purple (a purple area) that is a ductal epithelial cell, and an area estimated as a goblet cell that is in a color close to white and high in a circular degree. Further, the duct candidate area extracting module 105 performs an estimation judgment of those three areas based on pigment information set in advance to extract (detect) the duct candidate area in which the ducts within the tissue area are contained.

Now, the action of the duct candidate area extracting module 105 when extracting the duct candidate area from the biological image will be described in details.

First, the duct candidate area extracting module 105 extracts a purple area (purplearea) based on a hue in the biological image.

Note here that the purple in the biological image indicates the epithelial cells that constitute the ducts. The processing for extracting the purple detects the pixels within a color range of the hue H of preset HSV values (hue (H), saturation (S), and value (V)).

Further, the duct candidate area extracting module 105 extracts a goblet area (gobletarea) that is similar to white, smaller than an area set in advance, and higher in a circular degree than a specific circular degree from the biological image (a goblet area extracting function).

Note here that the duct candidate area extracting module 105 measures the circular degree described above according to a circular degree (=(4π×area)/(perimeter×perimeter)), flatness acquired by elliptically approximating the shape (=(major axis−minor axis)/major axis), eccentricity (=distance between focal points/major axis), etc.

Further, the duct candidate area extracting module 105 sets a union of the areas extracted in step S901 and step S902 as a ductal epithelial candidate area (epitheliarea).

Note here that the ductal epithelial candidate area (epitheliarea) is set as a union of the purple area (purplearea) and the goblet area (gobletarea) shown in a following Expression 1.

$$epitheliarea = purplearea \cup gobletarea \qquad \text{[Expression 1]}$$

Further, the duct candidate area extracting module 105 has a cell-nucleus area extracting function which extracts the area dyed in bluish purple by hematoxylin from the biological image as a cell-nucleus area (nucleiarea).

When extracting the cell-nucleus area, the duct candidate area extracting module 105 applies a gauss filter on a gray scale image of the hematoxylin signal, transforms it to a binary image based on a threshold value set in advance, selects clusters in a size corresponding to the cell-nucleus, and performs processing for burying pores smaller than a pore image of a specific value to extract the cell-nucleus area.

The processing for burying the small pores eliminates the vacant cell-nucleuses by burying them, thereby making it possible to easily specify the duct candidate area to be extracted.

Further, the duct candidate area extracting module 105 sets the union of the extracted areas as the duct candidate area (ductarea). That is, the duct candidate area extracting module 105 detects the duct candidate area (ductarea) as a union of the ductal epithelial cell candidate area (epitheliarea) and the cell-nucleus area (nucleiarea) shown in a following Expression 2.

$$ductarea = epitheliarea \cup nucleiarea \qquad \text{[Expression 2]}$$

A duct is constituted with a cell-nucleus that forms the duct, an epithelial cell dyed in purple, and a goblet cell existing in the epithelial cell.

Further, the duct candidate area extracting module 105 buries small-area pores surrounded by the set duct candidate area (ductarea), and updates the duct candidate area (ductarea) by including the epithelial cell area (epitheliarea) in which the pores are buried.

Further, the threshold value and the specific width used in the explanations above may be the values calculated in advance based on the duct image data. Furthermore, this threshold value may be the value calculated in advance by using a learning algorithm, a discriminating/analyzing method, or the like.

The stroma area/duct area detecting module 106 has: a candidate area comparing function which collates and compares the stroma candidate area and the duct candidate area extracted as the candidate areas by the stroma candidate area extracting module 104 and the duct candidate area extracting module 105; and a stroma/duct area setting function which determines each of the areas so that the stroma area and the duct area are exclusive, and extracts the area overlapping with the tissue area extracted by the tissue area extracting module 103 as the stroma area and the duct area.

The intraduct cell-nucleus detecting module 107 has a cell-nucleus detecting function which detects the intraduct cell-nucleus by extracting the area where the duct area set by the stroma area/duct area detecting module 106 and the area of a high hematoxylin signal overlap on one another.

In this exemplary embodiment, the area where the hematoxylin signal is between given threshold values in the cell-nucleus extracting function is taken as the cell-nucleus area (nucleiarea).

Further, the epithelial cell area (epitheliarea) that is not the ductal cell-nucleus area is detected by the intraduct cell-nucleus detecting module 107 as a product set of the duct area and the area that is not the cell-nucleus area shown in a following Expression 3.

$$epitheliarea = ductarea \cap \neg nucleiarea \qquad \text{[Expression 3]}$$

Figure 10A:
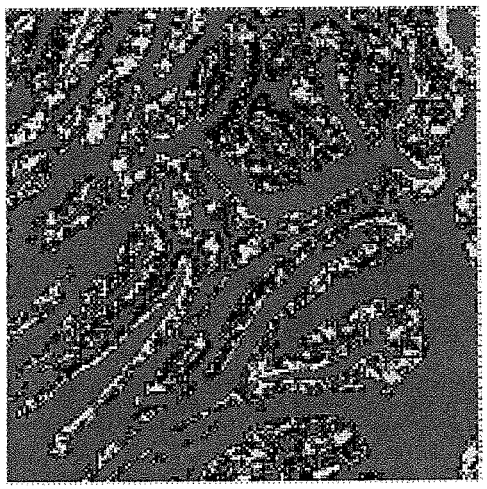
FIG. 10A is an explanatory image showing a detection example of cell-nucleuses that constitute stroma and ducts of a high differentiated adenocarcinoma that is a malignant epithelial tumor and epithelial cells of the ducts shown in an input image of the pathologic tissue image analyzing apparatus disclosed in FIG. 1.
Figure 10B:
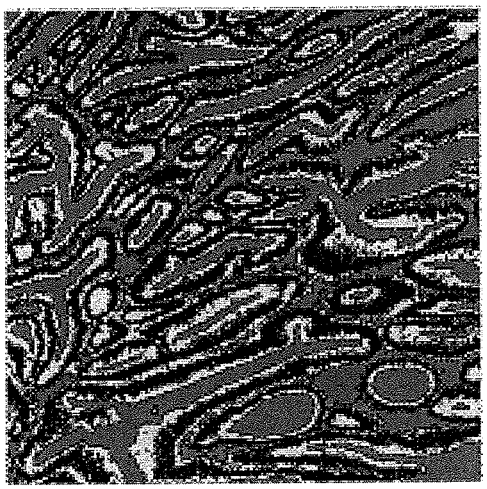
FIG. 10B is an explanatory image showing a detection example of cell-nucleuses that constitute stroma and ducts and epithelial cells of the ducts in an input image of a tubular adenoma that is a benign epithelial tumor.

Note here that FIG. 10A and FIG. 10B show examples of detecting the cell-nucleuses constituting the stroma as well as the ducts and the duct epithelial cells in the images of a high differentiated adenocarcinoma as a malignant epithelial tumor and a tubular adenoma that is a benign epithelial tumor, respectively.

The duct formation evaluating module 108 calculates the heterotypic degree of the ducts by conducting evaluations regarding whether the detected intraduct cell-nucleuses are distributed irregularly based on the position of the preset base area or distributed and arranged on the base area side.

For example, when the calculated heterotypic degree is lower than the reference heterotypic degree set in advance, it can be judged as a normal duct or a benign cancer. When the heterotypic degree is higher, it can be judged as a malignant cancer.

The duct formation evaluating module 108 evaluates whether the intraduct cell-nucleuses are distributed irregularly or arranged and distributed on the base side (base area) set in advance. Thereby, the duct formation evaluating module 108 evaluates the regularity of the distribution state (arranged state) of the cell-nucleuses within the duct (a cell-nucleus distribution evaluating function).

Here, the function of evaluating the regularity of the distribution state (arranged state) of the cell-nucleuses within the duct (a cell-nucleuses distribution evaluating function) will be described in details.

The duct formation evaluating module 108 extracts each duct in the biological image detected by the stroma area/duct area detecting module 106 as individual clusters, and labels each of the ducts (a duct labeling processing function).

Further, the duct formation evaluating module 108 executes threshold-value judging processing (1-3) based on respective following conditions 1-3 by each of the ducts (a duct threshold-value judging function).

First, the duct formation evaluating module 108 judges whether the cluster number of the cell-nucleuses within each duct is larger than a specific value (condition 1: referred to as a "cluster judgment threshold-value") set in advance or not (threshold-value judging processing 1). For example, the cell-nucleuses are arranged in an orderly manner in a tubular adenoma within the tissue area, so that the cell-nucleus areas are detected in a connected manner (continuously). Thus, there is a tendency that the cluster number of the set cell-nucleuses becomes smaller than the cluster judgment threshold value.

In the meantime, in a case of a high differentiated adenocarcinoma, the arrangement of the cell-nucleuses is disordered. Thus, the vacant cell-nucleus is not detected in a connected manner even in a case of a single cell-nucleus. Therefore, the more number of clusters of the set cell-nucleuses are detected.

Further, the duct formation evaluating module 108 judges whether the proportion of the area of the duct with respect to the sum of the areas of the cell-nucleuses (sum of the area of the cell-nucleuses/area of the duct) is larger than a specific value (condition 2: referred to as a "duct area judgment threshold-value") set in advance or not (threshold-value judging processing 2).

Note here that the area of the cell-nucleuses of the tubular adenoma is about ½ of the epithelium from the base side, so that it is considered that the area ratio of the nucleuses with respect to the duct does not exceed ½ so greatly.

Further, the duct formation evaluating module 108 judges whether the average area of the cell-nucleuses, i.e., the proportion of number of the cell-nucleuses with respect to the sum of the areas of the cell-nucleuses (sum of the areas of the cell-nucleuses/number of the cell-nucleuses) is larger than a specific value (condition 3: referred to as a "cell-nucleus average area judgment threshold-value") set in advance or not (threshold-value judging processing 3).

Note here that the duct formation evaluating module 108 can evaluate the size of the cell-nucleuses since the cell-nucleuses of the high differentiated adenocarcinoma are normally swollen.

Further, the area of the cell-nucleus of a normal duct is small, so that the duct formation evaluating module 108 can distinguish the normal duct (tubular adenoma) from the high differentiated adenocarcinoma more accurately by the judgment based on the condition (condition 3).

Furthermore, the duct formation evaluating module 108 has a duct shape judging function which judges whether the shape of the duct is a tubular shape or a linear shape.

Note here that the duct formation evaluating module 108 has a degeneration processing function which performs degeneration processing (degeneration image processing) on each duct in the image data binarized in advance in order to judge the shape of the duct.

Figure 12A:
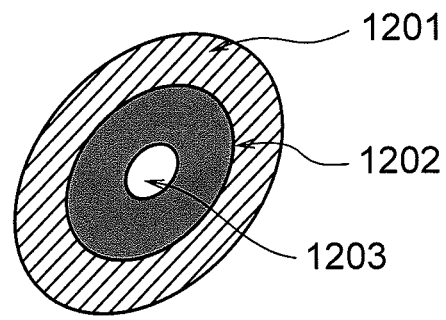
FIG. 12A is an explanatory illustration which schematically shows a tubular duct contained in an input image of the pathologic tissue image analyzing apparatus disclosed in FIG. 1.
Figure 12B:
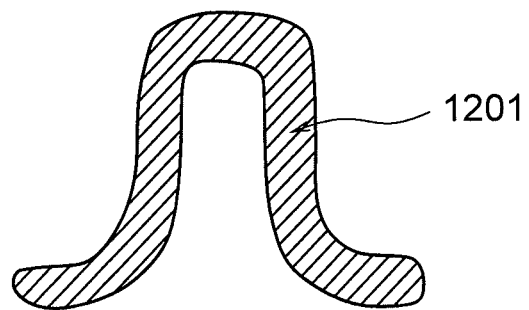
FIG. 12B is an explanatory illustration which schematically shows a linear duct contained in the input image.

FIG. 12A shows a tubular duct, and FIG. 12B shows a linear duct in a schematic manner.

With the degeneration image processing, the duct formation evaluating module 108 performs the image processing for burying the pores in the duct in the image (e.g., 1203 of FIG. 12A).

Note here that the area of 1201 in FIG. 12A, for example, is an area eliminated by the degeneration image processing, and 1202 in FIG. 12A shows an area remained even after the degeneration processing.

Further, when the area ratio of the area (1202 in FIG. 12A) remained after performing the degeneration image processing on the area of the duct is equal to or larger than a specific value set in advance, the duct formation evaluating module 108 judges the shape of the duct as a tubular shape (a tubular duct judging function).

The duct formation evaluating module 108 has a tubular duct cell-nucleus distribution judging function which evaluates the distribution of the cell-nucleus arrangement within the duct regarding the duct judged as a tubular shape (tubular duct).

The duct formation evaluating module 108 takes the area (e.g., 1201 in FIG. 12A) eliminated by performing the degeneration image processing as the base area of the tubular duct, and calculates the occupying area ratio of the cell-nucleuses on the base area side.

Further, when the occupying area ratio of the cell-nucleuses is smaller than the specific value set in advance, the duct formation evaluating module 108 judges that the cell-nucleuses are not distributed (arranged) on the base area side.

In that case, the output module 109 outputs the duct as a heterotypic duct.

Furthermore, the duct formation evaluating module 108 evaluates and judges the distribution state (arrangement) of the cell-nucleuses within the linear duct regarding the duct that is not judged as a tubular duct by the duct shape judging function, i.e., regarding the duct judged as a linear duct (a linear duct cell-nucleus distribution judging function).

Here, the contents of the linear duct cell-nucleus distribution judging function for evaluating the cell-nucleus arrangement in the linear duct will be described in details.

The duct formation evaluating module 108 performs thinning processing on the duct (the linear duct) judged as being linear in the input image (a thinning processing function) to generate a thinned image.

Figure 14A:
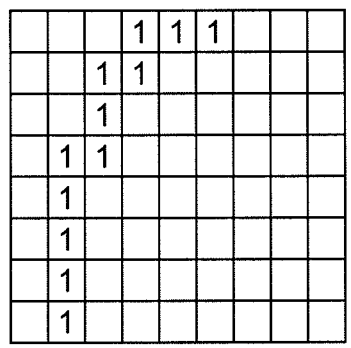
FIG. 14A is an explanatory chart showing a thinned area in which the linear duct is expressed with a thin line of the pathologic tissue image analyzing apparatus disclosed in FIG. 1.

The thinned image is an image of the thinned linear duct as shown in FIG. 14A, for example, and it is constituted with pixels of the thinned area (=1) and the background area (=0).

It is so defined that the thinned area of the thinned image is set at positions dividing the width of the linear duct into two along the longitudinal direction of the linear duct.

Then, the duct formation evaluating module 108 performs processing for shifting each of the pixels in the thinned image (FIG. 14A) to the eight directions in the surroundings (vertically, laterally, obliquely) by one pixel.

Here, out of the pixels in the thinned image, the duct formation evaluating module 108 calculates the number of shifted pixels whose pixel bits do not overlap with the original pixel bits, and determines the direction where the number of the no-overlapping pixels becomes the maximum (a shift direction determining function).

Figure 14B:
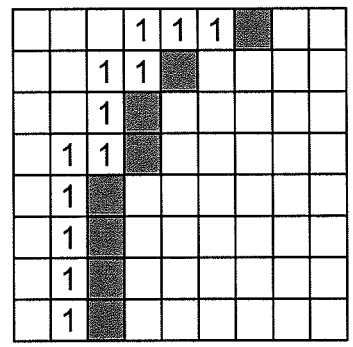
FIG. 14B is an explanatory chart showing a case where the thinned area of FIG. 14A is shifted to a right side for one pixel.
Figure 14C:
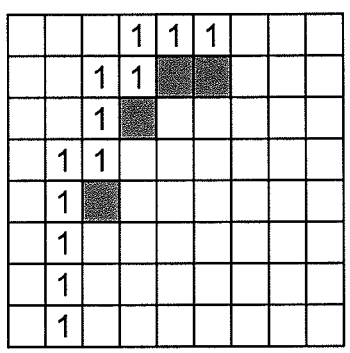
FIG. 14C is an explanatory chart showing a case where the thinned area of FIG. 14A is shifted to a lower side for one pixel.

Specifically, FIG. 14B, for example, shows the pixels (gray area) on which the thinned areas (1) of the thinned image do not overlap when the thinned image is shifted to the right by one pixel. Further, FIG. 14C shows the pixels (gray area) on which the thinned areas (1) of the original thinned image do not overlap when the thinned image is shifted to the lower side by one pixel, and FIG. 14D shows the pixels (gray area) on which the thinned areas (1) of the original thinned image do not overlap when the thinned image is shifted to the lower-right side by one pixel.

Figure 14D:
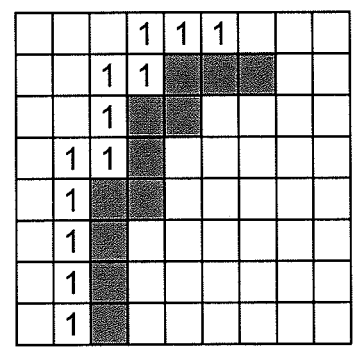
FIG. 14D is an explanatory chart showing a case where the thinned area of FIG. 14A is shifted to a lower-right side for one pixel.

In this case, FIG. 14D is the case where the number of no-overlapping pixels becomes the maximum. Thus, the direction where the number of no-overlapping pixels becomes the maximum is determined as the "lower-right" direction.

The duct formation evaluating module 108 shifts the thinned area in the calculated direction within a range of the thickness of the duct, and extracts the shifted pixels as shifted/extracted pixels (shifted pixel extraction processing).

This processing is performed continuously to the contour in one of the longitudinal directions of the linear duct, and a union of the shifted/extracted pixels and the duct area is acquired (a base area setting function).

Thereby, the area from the position where the thinned area is set in advance to the contour of the linear duct, i.e., a vertically half area within the linear duct when the longitudinal direction of the linear duct is taken as vertical, can be extracted as the base area.

Figure 15:
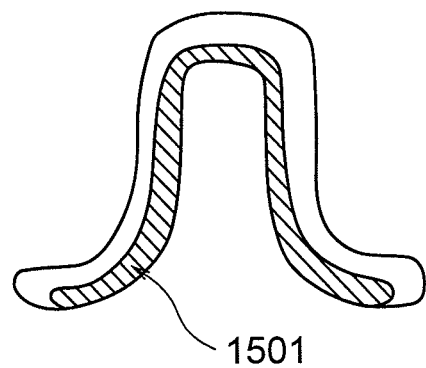
FIG. 15 is an explanatory illustration which schematically shows a base area of a linear duct contained in the input image of the pathologic tissue image analyzing apparatus disclosed in FIG. 1.

The extracted base area herein is a vertically (longitudinally) half area of the linear duct as shown as a shaded area 1501 of FIG. 15, for example.

The duct formation evaluating module 108 calculates the occupying area ratio of the cell-nucleus in the extracted vertically half area (base area) of the duct.

When the calculated occupying area ratio is within a specific value range set in advance, i.e., when it is judged that the cell-nucleus is not distributed unevenly in one of the vertically half areas of the duct, the output module 109 outputs the duct as a heterotypic duct.

The output module 109 has an output display function which outputs the heterotypic degree of the duct calculated by the duct formation evaluating module 108 as the calculation result on a display set in advance.

The output module 109 outputs the results calculated by arbitrary modules of the image analyzing apparatus 100 and the processing results thereof on the display by the output display function.

Next, outlines of the entire actions of the exemplary embodiment will be described.

First, the stroma area/duct area detecting module 106 detects the duct area from the image based on the duct characteristic information set in advance which shows the characteristic of the duct within the tissue area (a duct area detecting step). The intraduct cell-nucleus detecting module 107 extracts the cell-nucleuses contained within the detected duct area based on the pigment reference set in advance (a cell-nucleus extracting step), and the duct formation evaluating module 108 calculates the heterotypic degree of the duct based on the distribution state of the extracted cell-nucleuses with respect to the base area set in advance in each of the ducts (a duct heterotypic degree calculating step).

Note here that the execution contents of the duct area detecting step, the cell-nucleus extracting step, and the duct heterotypic degree calculating step may be put into a program to have it executed by a computer.

Figure 4:
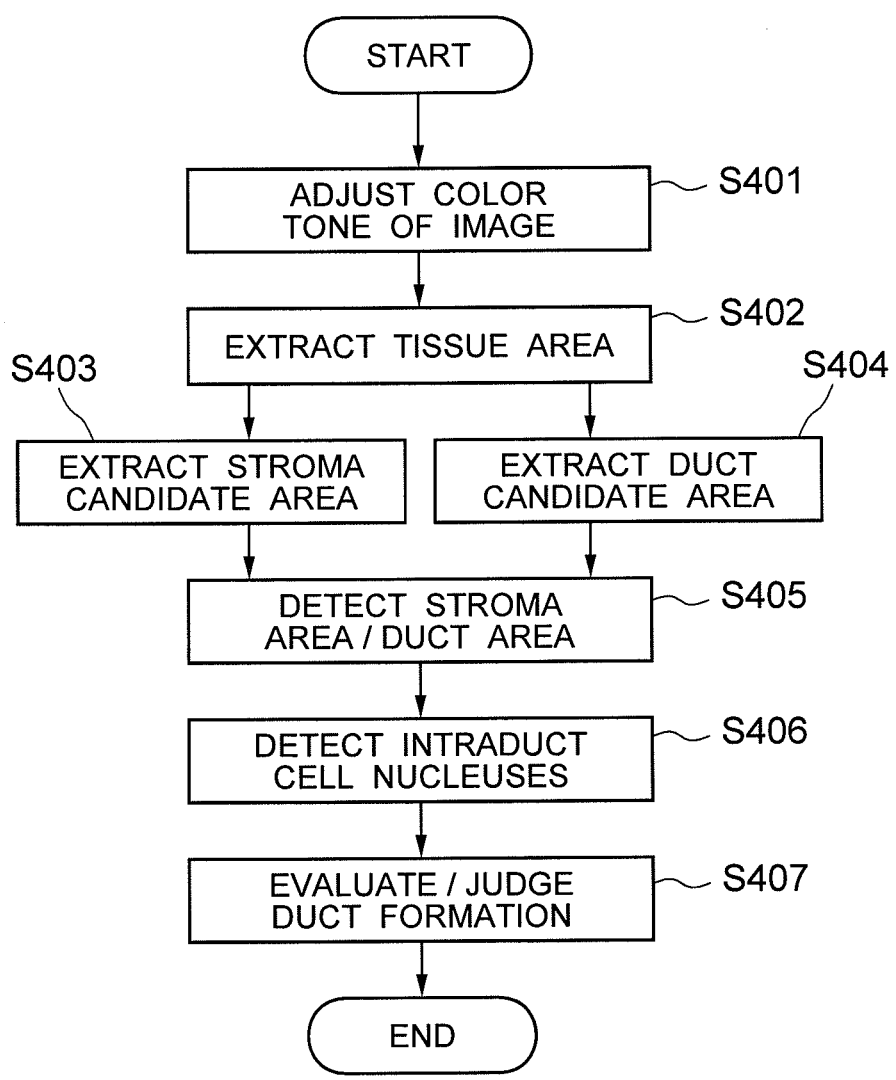
FIG. 4 is a flowchart showing entire action processing steps of the pathologic tissue image analyzing apparatus disclosed in FIG. 1.
Figure 5:
FIG. 5 shows explanatory images showing an example of a tubular adenoma as a benign epithelial tumor contained in an input image of the pathologic tissue image analyzing apparatus disclosed in FIG. 1.
Figure 6:
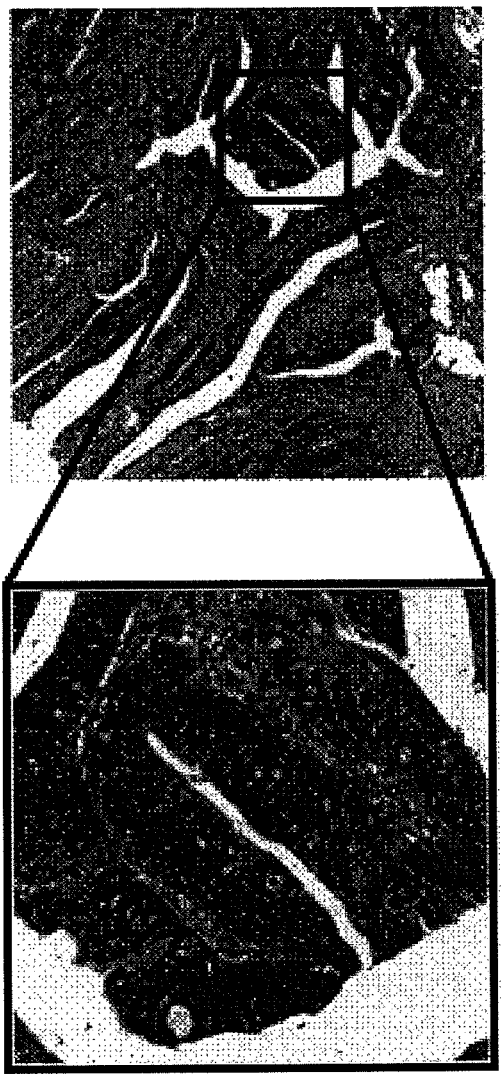
FIG. 6 shows explanatory images showing an example of a high differentiated adenocarcinoma as a malignant epithelial tumor contained in an input image of the pathologic tissue image analyzing apparatus disclosed in FIG. 1.

Next, the actions of the exemplary embodiment will be described in details by referring to a flowchart of FIG. 4.

First, the image color tone adjusting module 102 adjusts white and hematoxylin in the biological image into colors (color tones) set in advance (step S401: a color tone adjusting step).

Note here that a hue value range of white and a hue value range of bluish purple are set in advance, and the hues are shifted to adjust the colors to the set ranges.

Then, the tissue area extracting module 103 extracts the tissue area in the biological image (tissue area extracting processing) by eliminating the background area close to white in the biological image that has undergone the color tone adjusting processing executed by the image color tone adjusting module 102 (step S402: a tissue area extracting step).

In the tissue area extracting processing, the tissue area extracting module 103 performs threshold-value processing on the color similar to white based on the saturation and the value set in advance to perform processing for burying the pores in a size equal to or smaller than a given area size in the biological image.

Further, the tissue area extracting module 103 extracts a large tissue area that is equal to or more than a specific area size set in advance as an evaluation-target tissue area in order to eliminate a small-piece tissue and a noise.

Then, the stroma candidate area extracting module 104 detects an area (stroma area) that is not the duct area in the biological image (from which the tissue area is extracted) as a stroma candidate area (step S403: a stroma candidate area detecting step).

Now, based on sub-steps (steps S701-705: FIG. 7) shown below, actions for extracting the stroma candidate area from the biological image such as pathologic tissue image data (the stroma candidate area detecting step) executed by the stroma candidate area extracting module 104 will be described in details by referring to a flowchart of FIG. 7.

First, the stroma candidate area extracting module 104 extracts a pink area (pinkarea) from the biological image based on the hue. Further, the stroma candidate area extracting module 104 performs color processing on each of the pixels of the biological image, and detects the pixels dyed in pink by eosin (step S701).

The color processing for extracting the pink area (pink area extracting processing) detects the pixels within a color range of hue H of the HSV values set in advance as a color dyed by eosin. While this exemplary embodiment utilizes a color range based on the HSV values as a color dyed by eosin, it is also possible to utilize values of RGB (red (R), green (G), blue (B)) or CMY (Cyan, Magenta, Yellow) values.

Then, the stroma candidate area extracting module 104 extracts a lymphocyte area (lympharea) of highly dark blue hematoxylin signal, which is smaller than an area set in advance, from the biological image (step S702).

Hematoxylin dyes the cell-nucleuses, and also dyes lymphocyte very well. Further, the color of the lymphocyte dyed by hematoxylin is dark blue which is higher in the value than that of bluish purple that is the color the cell-nucleuses are dyed.

Thus, the stroma candidate area extracting module 104 enhances the value of blue (value enhancing processing) and calculates the hematoxylin signal for distinguishing the lymphocyte from the cell-nucleus.

In the value enhancing processing, the stroma candidate area extracting module 104 transforms a histogram of the value of blue (FIG. 8B) into a histogram in which the value is enhanced (FIG. 8C) by using a sigmoid curve (FIG. 8A), for example, to calculate it as a hematoxylin signal.

Through transforming to the hematoxylin signal and performing the threshold-value processing by the stroma candidate area extracting module 104, the distinguishing accuracy of the cell-nucleus and the lymphocyte based on the colors can be improved.

Then, the stroma candidate area extracting module 104 sets the union of the areas extracted in step S701 and step S702 as a stroma candidate area (step S703).

The stroma candidate area (stromaarea) is set as a union of the pink area (pinkarea) and the lymphocyte area (lympharea) shown in a following Expression 4.

$$\text{stromaarea} = \text{pinkarea} \cup \text{lympharea} \quad \text{[Expression 4]}$$

As the texture characteristic of the stroma area, eosin-dyed pink, dark blue of the dyed lymphocyte, and white (faded color) are arranged in a mosaic pattern.

Then, the stroma candidate area extracting module 104 performs the image processing for burying the pores smaller than the area set in advance, which are similar to white and surrounded by the stroma candidate area set in step S703, to update the stroma candidate area that is set in advance (step S704: stroma candidate area update setting).

Then, the stroma candidate area extracting module 104 performs expansion/degeneration processing on the update-set stroma area to update the stroma candidate area (step S705).

Then, the duct candidate area extracting module 105 detects a duct candidate area of the biological image (step S404).

Here, actions for extracting the duct candidate area from the biological image will be described by referring to a flowchart of sub-steps (steps S901-S905) shown in FIG. 9.

First, the duct candidate area extracting module 105 extracts a purple area (purplearea) based on hues of the biological image (step S901).

Then, the duct candidate area extracting module 105 extracts a goblet area (gobletarea) which is close to white, smaller than an area set in advance, and higher than the circular degree from the biological image (step S902: a goblet area extracting step).

Thereafter, the duct candidate area extracting module 105 sets the union of the areas extracted in step S901 and step S902 as a ductal epithelial cell candidate area (epitheliarea) (step S903).

Then, the duct candidate area extracting module 105 extracts the area dyed in bluish purple by hematoxylin from the biological image as a cell-nucleus area (nucleiarea) (step S904: a cell-nucleus area extracting step).

Then, the duct candidate area extracting module 105 sets the union of the areas extracted in step S903 and step S904 as a duct candidate area (ductarea) (step S905).

Subsequently, the duct candidate area extracting module 105 buries small-area pores surrounded by the duct candidate area (ductarea) set in step 905, and updates and sets the duct candidate area (ductarea) by including the buried pores in the epithelial cell area (epitheliarea) (step S906).

In this exemplary embodiment, the processing order of step S403 and step S404 may be determined arbitrarily.

Then, the stroma area/duct area detecting module 106 detects the stroma area (stromaarea) and the duct area (ductarea) in such a manner that the stroma candidate area and the duct candidate area detected by the stroma candidate area extracting module 104 and the duct candidate extracting module 105, respectively, become exclusive sets with respect to each other by adding the tissue area extracted by the tissue area extracting module 103 (step S405).

The duct area (ductarea) is detected as a product set of the tissue area, the duct candidate area, and the area that is not the stroma candidate area as shown in a following Expression 5.

$$ductarea = ductarea \cap (\neg stromaarea) \cap tissuearea \quad [\text{Expression 5}]$$

Further, the stroma area (stromaarea) is detected as a product set of the stroma candidate area and the tissue area shown in a following Expression 6.

$$stromaarea = stromaarea \cap tissuearea \quad [\text{Expression 6}]$$

Then, the intraduct cell-nucleus detecting module 107 extracts the cell-nucleuses in the duct area that is detected by the stroma area/duct area detecting module 106 (step S406).

Then, the duct formation evaluating module 108 evaluates whether the intraduct cell-nucleuses are distributed irregularly or arranged on the base area side (step S407).

The regularity of the distributed state (arrangement state) of the cell-nucleuses within the duct is evaluated (a cell-nucleus distribution evaluating step).

Figure 11:
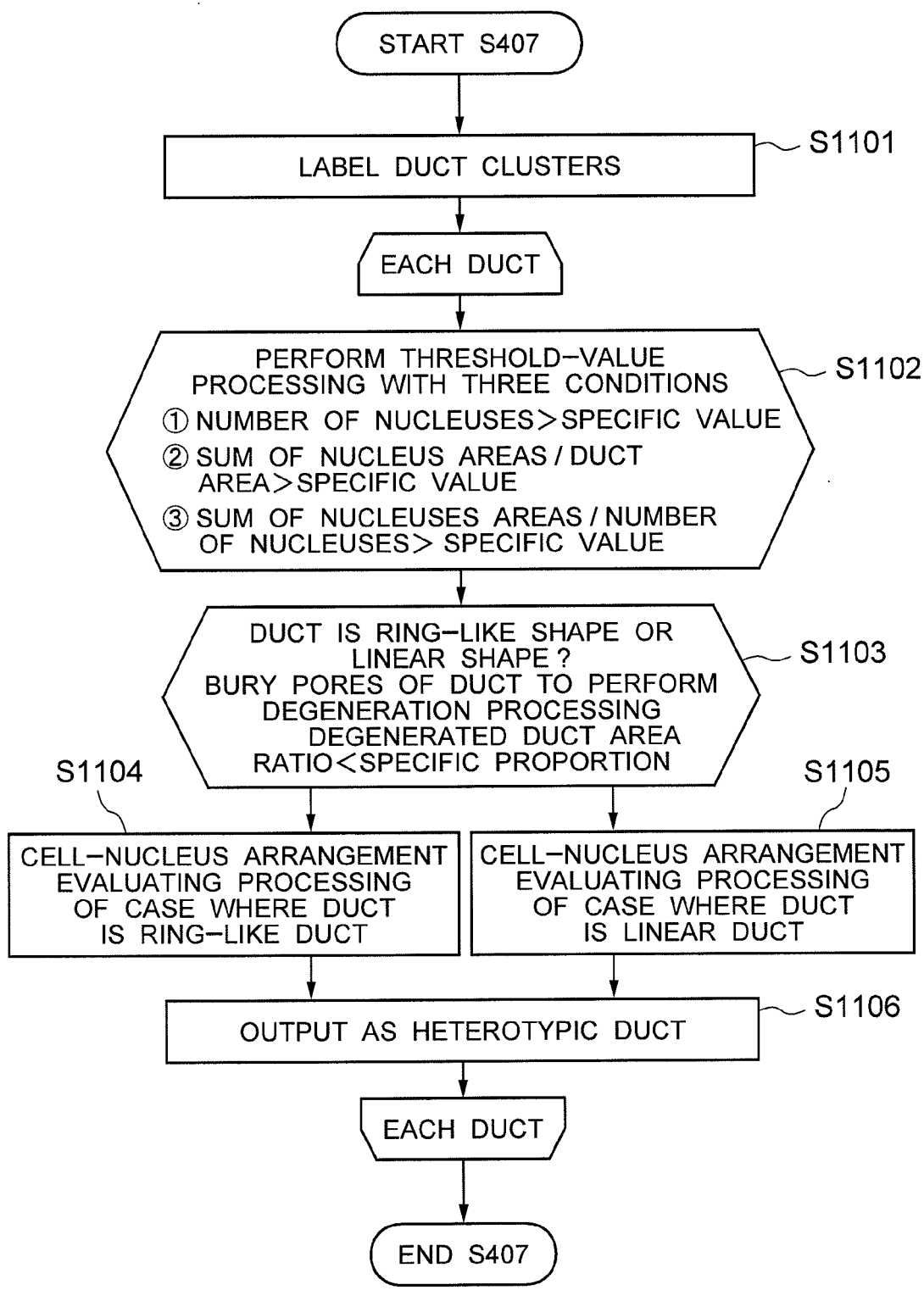
FIG. 11 is a flowchart showing action processing steps for making a duct formation evaluation and judgment by the pathologic tissue image analyzing apparatus disclosed in FIG. 1.

Here, the actions for evaluating the distribution of the cell-nucleuses within the duct (the cell-nucleus distribution evaluating step executed by the duct formation evaluating module 108) will be described by referring to a flowchart of FIG. 11.

First, the duct formation evaluating module 108 extracts each of the ducts in the biological image detected by the stroma area/duct area detecting module 106 as individual clusters, and labels each of the ducts (step S1101: a duct labeling processing step).

Then, the duct formation evaluating module 108 executes threshold-value judging processing (1-3) based on respective following conditions 1-3 by each of the ducts (step S1102: a duct threshold-value judging function).

First, the duct formation evaluating module 108 judges whether the cluster number of the cell-nucleuses within each duct is larger than a specific value (condition 1: referred to as a "cluster judgment threshold-value") set in advance or not (threshold-value judging processing 1). For example, the cell-nucleuses are arranged in an orderly manner in a tubular adenoma, so that the cell-nucleus areas are detected in a connected manner (continuously). Therefore, the set cluster number of the cell-nucleuses tends to be smaller than the cluster judgment threshold-value.

In the meantime, in a case of a high differentiated adenocarcinoma, the arrangement of the cell-nucleuses is disordered. Thus, the vacant cell-nucleus is not detected in a connected manner even in a case of a single cell-nucleus. Therefore, the more number of clusters of the set cell-nucleuses are detected.

Further, the duct formation evaluating module 108 judges whether the proportion of the area of the duct with respect to the sum of the areas of the cell-nucleuses (sum of the area of the cell-nucleuses/area of the duct) is larger than a specific value (condition 2: referred to as a "duct area judgment threshold-value") set in advance or not (threshold-value judging processing 2).

Note here that the area of the cell-nucleuses of the tubular adenoma is about ½ of the epithelium from the base side, so that it is considered that the area ratio of the nucleuses with respect to the duct does not exceed ½ so greatly.

Further, the duct formation evaluating module 108 judges whether the average area of the cell-nucleuses, i.e., the proportion of number of the cell-nucleuses with respect to the sum of the areas of the cell-nucleuses (sum of the area of the cell-nucleuses/number of the cell-nucleuses) is larger than a specific value (condition 3: referred to as a "cell-nucleus average area judgment threshold-value") set in advance or not (threshold-value judging processing 3).

Note here that the duct formation evaluating module 108 can evaluate the size of the cell-nucleuses since the cell-nucleuses of the high differentiated adenocarcinoma are normally swollen.

Further, the area of the cell-nucleus of a normal duct is small, so that the duct formation evaluating module 108 can distinguish the normal duct (tubular adenoma) from the high differentiated adenocarcinoma more accurately by the judgment based on the condition (condition 3).

Then, the duct formation evaluating module 108 judges whether the shape of the duct is a tubular shape or a linear shape (step S1103: a duct shape judging step).

Note here that the duct formation evaluating module 108 performs degeneration image processing on each duct expressed as the binary image in order to judge the shape of the duct. FIG. 12A shows a tubular duct, and FIG. 12B shows a linear duct in a schematic manner.

With the degeneration image processing, the duct formation evaluating module 108 performs the image processing for burying the pores in the duct in the image (e.g., 1203 of FIG. 12A).

Note here that the area of 1201 in FIG. 12A, for example, is an area eliminated by the degeneration image processing, and 1202 in FIG. 12A shows an area remained even after the degeneration image processing.

Further, when the area ratio of the area (1202 in FIG. 12A) remained after performing the degeneration image processing on the area of the duct is equal to or larger than a specific value set in advance, the duct formation evaluating module 108 judges the shape of the duct as a tubular shape (a tubular duct judging step).

When judged that the shape of the duct is a tubular shape, the processing is advanced to step S1104. When judged that the shape of the duct is a linear shape, the processing is advanced to step S1105.

Then, the duct formation evaluating module 108 executes a nucleus distribution state judging function for evaluating the distribution of the cell-nucleus arrangement within the duct regarding the duct judged as the tubular duct in step S1103 (step S1104: a tubular duct cell-nucleus distribution judging function).

The duct formation evaluating module 108 takes the area (e.g., 1201 in FIG. 12A) eliminated by performing the degeneration image processing in step S1102 as the base area of the tubular duct, and calculates the occupying area ratio of the cell-nucleuses on the base area side.

Here, when the occupying area ratio of the cell-nucleuses is smaller than the specific value set in advance, the duct formation evaluating module 108 judges that the cell-nucleuses are not distributed (arranged) on the base area side, and outputs the duct as a heterotypic duct.

In the meantime, the duct formation evaluating module 108 evaluates and judges the distribution state (arrangement) of the cell-nucleuses within the linear duct regarding the duct that is judged as a tubular duct in step S1103 (the duct shape judging step), i.e., regarding the duct judged as a linear duct (step S1105: a linear duct cell-nucleus distribution judging step).

Figure 13:
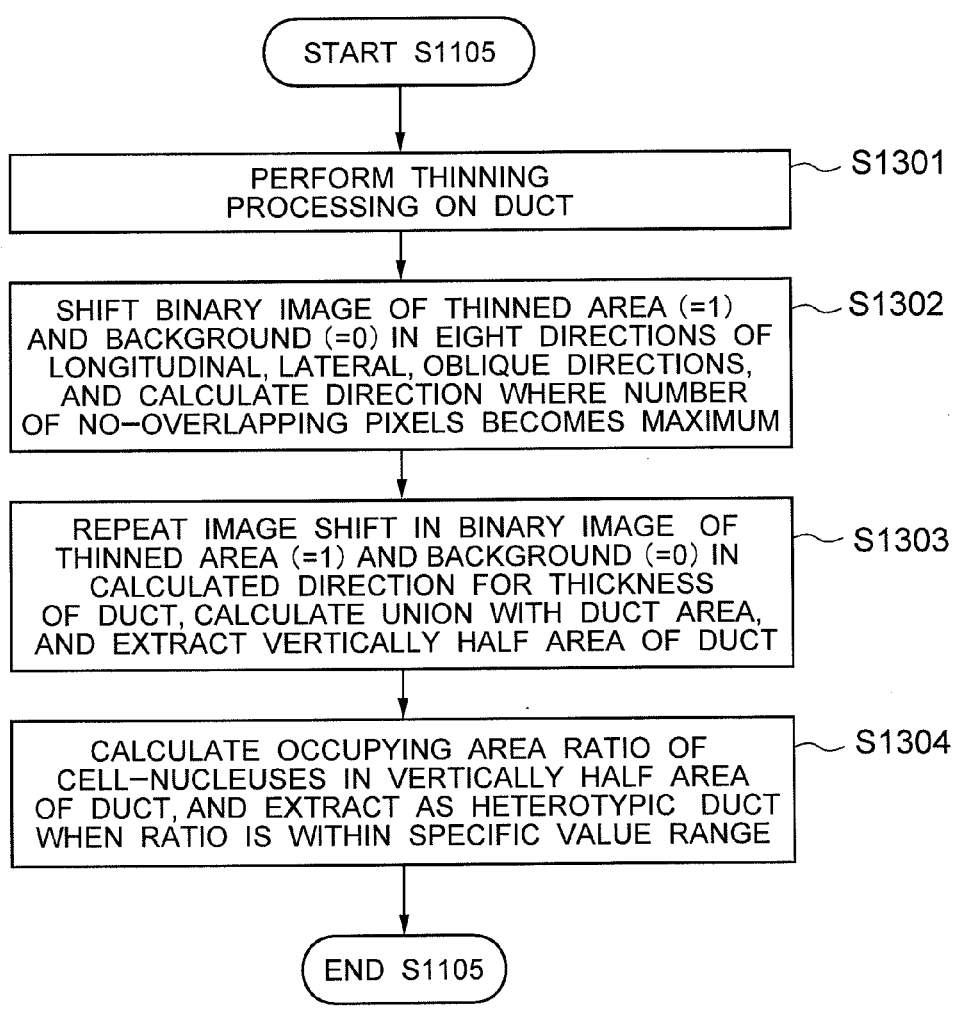
FIG. 13 is a flowchart showing action processing steps for evaluating the cell-nucleus distribution within a linear duct done by the pathologic tissue image analyzing apparatus disclosed in FIG. 1.

Here, actions for evaluating the cell-nucleus arrangement in the linear duct (the linear duct cell-nucleus distribution judging step) will be described by referring to a flowchart of FIG. 13.

First, the duct formation evaluating module 108 performs processing for thinning the duct (the linear duct) judged as the linear duct in the input image (step S1301: a thinning processing step) to generate a thinned image.

The thinned image is an image of the thinned linear duct as shown on FIG. 14A, for example, and it is constituted with pixels of the thinned area (=1) and the background area (=0). It is so defined that the thinned area of the thinned image is set at positions dividing the width of the linear duct into two along the longitudinal direction of the linear duct.

Then, the duct formation evaluating module 108 performs processing for shifting each of the pixels in the thinned image (FIG. 14A) to the eight directions in the surroundings (vertically, laterally, obliquely) by one pixel.

Here, out of the pixels in the thinned image, the duct formation evaluating module 108 calculates the number of shifted pixels whose pixel bits do not overlap with the original pixel bits prior to being shifted, and determines the direction where the number of the no-overlapping pixels becomes the maximum (step S1302: a shift direction determining step).

Specifically, FIG. 14B, for example, shows the pixels (gray area) on which the thinned areas (1) of the thinned image do not overlap when the thinned image is shifted to the right by one pixel. Further, FIG. 14C shows the pixels (gray area) on which the thinned areas (1) of the original thinned image do not overlap when the thinned image is shifted to the lower side by one pixel, and FIG. 14D shows the pixels (gray area) on which the thinned areas (1) of the thinned image do not overlap when the thinned image is shifted to the lower-right side by one pixel.

In this case, FIG. 14D in which the thinned image is shifted to the lower-right side is the case where the number of no-overlapping pixels becomes the maximum. Thus, the direction where the number of no-overlapping pixels becomes the maximum is determined as the "lower-right" direction.

Then, the duct formation evaluating module 108 shifts the thinned area in the direction calculated in step S1302 within a range of the thickness of the duct, and extracts the shifted pixels. This processing is performed continuously to the contour of the duct to extract an area from the position where the thinned area is set in advance to the contour of the linear duct, i.e., a vertically half area (a shaded area 1501 in FIG. 15) when the longitudinal direction of the linear duct is considered as the vertical direction as the base area (step S1303: a base area setting step). Thereby, the extracted base area herein becomes a vertically (longitudinally) half area of the linear duct as shown as a shaded area 1501 of FIG. 15, for example.

Then, the duct formation evaluating module 108 calculates the occupying area ratio of the cell-nucleuses in the vertically half area (base area) of the duct extracted in step S1303. When the calculated occupying area ratio is within a specific value range set in advance, i.e., when it is judged that the cell-nucleuses are not distributed unevenly in one of the vertically half areas of the duct, the duct formation evaluating module 108 sends out the duct as a heterotypic duct (step S1304).

Then, the output module 109 outputs and displays the heterotypic degree of the duct calculated by the duct formation evaluating module 108 on a display set in advance (step S1106). Subsequently, the duct formation evaluating module 108 performs the evaluation processing on each of the ducts (to step S1102).

As described above, the pathologic tissue image analyzing apparatus according to the exemplary embodiment is capable of discriminating adenoma from adenocarcinoma with high accuracy through extracting the duct area from the pathologic tissue image (a biology tissue image) and evaluating whether the cell-nucleuses within the duct area are irregularly distributed or arranged on the base side.

Further, through extracting the texture characteristic of the stroma and the characteristic of the duct (the duct detecting step), it becomes possible to detect the duct with fine accuracy even in a case of the duct constituted with vacant nucleuses, a case where the cell-nucleus area constituting the duct cannot be extracted as a closed area, a case where the gland lumen is not closed, and a case where the duct has a loop and filled structure.

Furthermore, even in a case where each one of the cell-nucleuses that form the duct within the biology tissue image cannot be identified, it is possible to calculate the heterotypic degree of the duct quantitatively through extracting the base side of the duct (the base area) and evaluating the distribution of the cell-nucleuses and the occupying ratio in the area on the basis of the base side. Therefore, pathologists can diagnose the benign degree or the malignant degree of carcinomas in the ducts by using the quantitative information of the cell-nucleus distribution within the duct area, i.e., it becomes possible to improve the judgment accuracy regarding cancers in pathologic diagnoses.

While the present invention has been described heretofore by referring to the embodiments (and EXAMPLES), the present invention is not limited only to the embodiments (and EXAMPLES). Various changes and modifications occurred to those skilled in the art can be applied to the structures and details of the present invention without departing from the scope of the present invention.

This application claims the Priority right based on Japanese Patent Application No. 2009-134218 filed on Jun. 3, 2009 and the disclosure thereof is hereby incorporated by reference in its entirety.

INDUSTRIAL APPLICABILITY

The present invention can be effectively applied to computer devices that conduct analyses of biology tissue images.

REFERENCE NUMERALS

100 Image analyzing apparatus
101 Input module
102 Image color tone adjusting module
103 Tissue area extracting module
104 Stroma candidate area extracting module
105 Duct candidate area extracting module
106 Stroma area/duct area detecting module
107 Intraduct cell-nucleus detecting module
108 Duct formation evaluating module
109 Output module

The invention claimed is:

1. A pathologic tissue image analyzing apparatus, comprising an image analyzing main unit which conducts an analysis of a biology tissue image inputted from outside, extracts ducts contained within a tissue area of the biology tissue image based on a result of the analysis, and extracts a duct of a specific heterotypic degree from a duct area containing the ducts, wherein the image analyzing main unit comprises:
   a duct area detecting module which detects the duct area from the tissue area based on preset duct characteristic information that shows characteristics of the ducts within the tissue area;
   a cell-nucleus detecting module which extracts cell-nucleuses contained in the detected duct area based on a preset pigment reference; and
   a duct heterotypic degree calculating module which calculates the heterotypic degree of the duct based on a distribution state of the extracted cell-nucleuses with respect to a preset base area in the duct.

2. The pathologic tissue image analyzing apparatus as claimed in claim 1, comprising a stroma area detecting module which detects a stroma area constituted with the stroma contained in the tissue area based on a preset texture characteristic within the tissue area, wherein
   the duct area detecting module includes an area determining/extracting function which extracts the duct area by determining the stroma area and the duct area within the tissue area exclusively from each other.

3. The pathologic tissue image analyzing apparatus as claimed in claim 2, including a tubular duct judging function which detects sizes of each of the cell-nucleuses within the duct, and judges the duct as a tubular duct when the size of the cell-nucleus is smaller than a preset cell-nucleus reference size.

4. The pathologic tissue image analyzing apparatus as claimed in claim 2, including the tubular duct judging function which counts number of the cell-nucleuses within the duct, and judges the duct as a tubular duct when the number of the cell-nucleuses is smaller than a preset cell-nucleus reference number.

5. The pathologic tissue image analyzing apparatus as claimed in claim 1, wherein the duct heterotypic degree calculating module includes:
   a degeneration processing function which performs degeneration processing on each of the ducts contained in the extracted duct area and enhanced-displays shapes of the each of the ducts; and
   a duct shape detecting/judging function which detects the shapes of the ducts and judges whether the shapes of the each of the ducts is tubular or linear.

6. The pathologic tissue image analyzing apparatus as claimed in claim 5, wherein the duct heterotypic degree calculating module includes:
   a tubular base area setting function which sets an area on which the degeneration processing is performed within each of the ducts judged as the tubular ducts as a tubular base area; and
   a tubular duct heterotypic degree calculating function which calculates the heterotypic degree of the duct based on a proportion of the cell-nucleuses in the tubular duct distributed within the tubular base area.

7. The pathologic tissue image analyzing apparatus as claimed in claim 5, including:
   a thinned image generating function which generates a thinned image by performing thinning processing on each of the ducts judged as the linear ducts;
   a linear base area setting function which sets an area between a contour line in one of longitudinal directions of the contour line of the duct and the thinned image as a linear base area; and
   a linear duct heterotypic degree calculating function which calculates the heterotypic degree of the duct based on a proportion of the cell-nucleuses in the linear duct distributed within the linear base area.

8. The pathologic tissue image analyzing apparatus as claimed in claim 1, comprising a stroma area detecting module which detects a stroma area constituted with the stroma contained in the tissue area based on the preset texture characteristic within the tissue area, wherein:
   the duct area detecting module includes an area determining/extracting function which extracts the duct area by determining the stroma area and the duct area within the tissue area exclusively from each other; and
   the duct heterotypic degree calculating module includes
   a degeneration processing function which performs degeneration processing on each of the ducts contained in the extracted duct area and enhanced-displays shapes of the each of the ducts, and
   a duct shape detecting/judging function which detects the shapes of the ducts and judges whether the shapes of the each of the ducts is tubular or linear.

9. A pathologic tissue image analyzing method, which conducts an analysis of a biology tissue image inputted from outside and extracts a duct of a specific heterotypic degree from ducts contained within a tissue area of the biology tissue image based on a result of the analysis, the method comprising:
   detecting the duct area from the tissue area based on preset duct characteristic information that shows characteristics of the ducts within the tissue area;
   extracting cell-nucleuses contained in the detected duct area based on a preset pigment reference; and
   calculating the heterotypic degree of the duct based on a distribution state of the detected cell-nucleuses with respect to a preset base area in the duct.

10. A non-transitory computer readable recording medium storing a pathologic tissue image analyzing program for conducting an analysis of a biology tissue image inputted from outside and extracting a duct of a specific heterotypic degree from ducts contained within a tissue area of the biology tissue image based on a result of the analysis, the program causing a preset computer to execute:
   a duct area detecting function which detects the duct area from the tissue area based on preset duct characteristic information that shows characteristics of the ducts within the tissue area;

a cell-nucleus detecting function which extracts cell-nucleuses contained in the detected duct area based on a preset pigment reference; and a duct heterotypic degree calculating function which calculates the heterotypic degree of the duct based on a distribution state of the detected cell-nucleuses with respect to a preset base area in the duct.

11. A pathologic tissue image analyzing apparatus, comprising image analyzing main means for conducting an analysis of a biology tissue image inputted from outside, extracting ducts contained within a tissue area of the biology tissue image based on a result of the analysis, and extracting a duct of a specific heterotypic degree from a duct area containing the ducts, wherein the image analyzing main means comprises:

duct area detecting means for detecting the duct area from the tissue area based on preset duct characteristic information that shows characteristics of the ducts within the tissue area;

cell-nucleus detecting means for extracting cell-nucleuses contained in the detected duct area based on a preset pigment reference; and duct heterotypic degree calculating means for calculating the heterotypic degree of the duct based on a distribution state of the extracted cell-nucleuses with respect to a preset base area in the duct.

\* \* \* \* \*